United States Patent [19]
Bray et al.

[11] Patent Number: 5,536,069
[45] Date of Patent: *Jul. 16, 1996

[54] ROTARY ACTION SWITCH ASSEMBLY

[75] Inventors: Martin L. Bray, Rochester Hills; Thomas M. Frusti, Canton; Dee T. Kapur, Ypsilanti, all of Mich.

[73] Assignee: Ford Motor Company, Dearborn, Mich.

[*] Notice: The term of this patent shall not extend beyond the expiration date of Pat. No. 5,507,560.

[21] Appl. No.: 134,704

[22] Filed: Oct. 12, 1993

[51] Int. Cl.⁶ ........................................... B60N 2/22
[52] U.S. Cl. ............... 297/362.11; 297/341; 297/378.12
[58] Field of Search ..................... 297/341, 361.1, 297/362.11, 354.12, 378.1, 378.12; 296/65.1

[56] References Cited

U.S. PATENT DOCUMENTS 2,660,223 11/1953 Appleton .
2,809,689 10/1957 Garvey et al. .
2,823,949 2/1958 Williams et al. .
3,655,240 4/1972 DuRocher et al. ................ 297/379
3,756,655 9/1973 Perkins ................................ 297/379
3,761,730 9/1973 Wright ................................. 180/112
4,518,190 5/1985 Klüting ..................... 297/378.12 X
4,832,403 5/1989 Tomita .
4,922,426 5/1990 Obara et al. .

FOREIGN PATENT DOCUMENTS 158607 10/1985 European Pat. Off. ............ 297/341

Primary Examiner—Peter R. Brown
Attorney, Agent, or Firm—Daniel M. Stock; Roger L. May

[57] ABSTRACT

A rotary action switch assembly for a vehicle seat includes a base member operatively connected to a seat portion of a vehicle seat, an actuator member operatively connected to a back portion of the vehicle seat, and a rotatable contact structure disposed between the base member and the actuator member for opening and closing circuits indicate of inclination of the back portion relative to the seat portion.

20 Claims, 4 Drawing Sheets

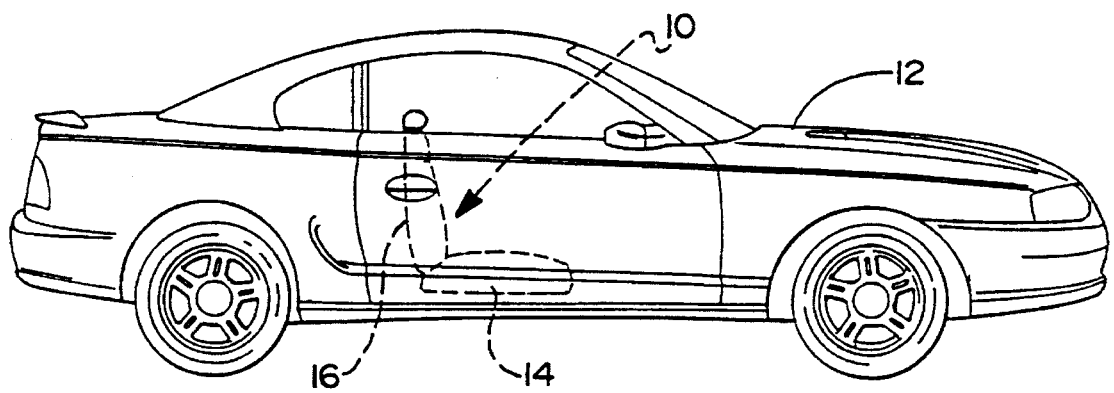
FIG I
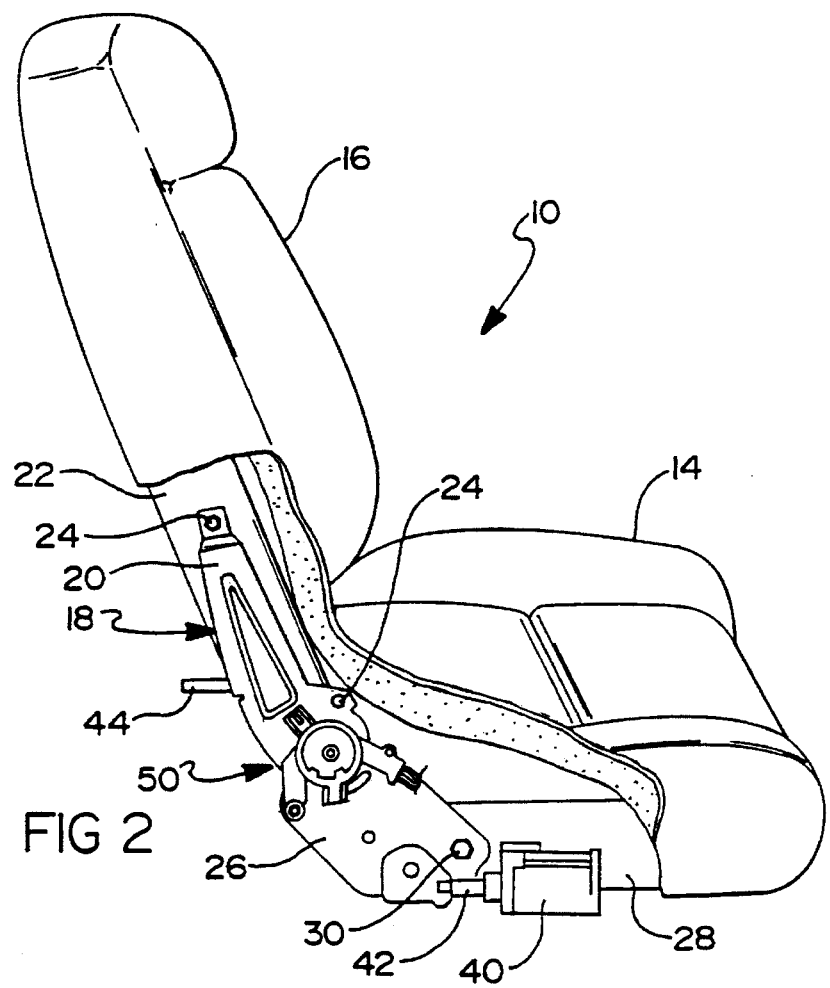
FIG 2

ROTARY ACTION SWITCH ASSEMBLY

BACKGROUND OF THE INVENTION

1. Field of the Invention

The present invention relates generally to electrical switches and, more specifically, to a rotary action switch assembly for a vehicle seat.

2. Description of the Related Art

It is known to construct seats for occupants of vehicles such as automotive vehicles. Typically, the seats are adjustable forward and backward and for height and tilt. As to tilt, the seats generally include a recliner mechanism to allow a back portion of the seat to tilt forward to a dump position and tilt rearward to a recline position. Commonly, pin or plunger switches are positioned on the recliner mechanism to sense the dump or recline positions and activate an autoglide system which moves or powers the seat forward and rearward for ingress and egress of the vehicle by an occupant. Although the above pin switches provide for activating the autoglide system, they are sensitive to rotational tolerances and variations in the forward and rearward positions of the back portion. These pin switches are also sensitive to overtravel of the back portion and may become damaged if the overtravel is extreme. Further, these pin switches are not self-contained and are sensitive to side loading.

SUMMARY OF THE INVENTION

Accordingly, the present invention is a rotary action switch assembly for a vehicle seat includes a base member operatively connected to a seat portion of a vehicle seat, an actuator member operatively connected to a back portion of the vehicle seat, and rotatable contact means disposed between the base member and the actuator member for opening and closing circuits indicative of inclination of the back portion relative to the seat portion.

One feature of the present invention is that a rotary action switch assembly is provided for a vehicle seat. Another feature of the present invention is that the rotary action switch assembly provides a self contained dual switch for rotary actuation that can accommodate large rotational tolerances and variations in the forward and rearward positions of the back portion. Yet another feature of the present invention is that the rotary action switch assembly can accommodate overtravel of the back portion and is less susceptible to damage if the overtravel is extreme. Still another feature of the present invention is that the rotary action switch assembly provides a multi-position, modular system for rotational detection of the back portion.

Other features and advantages of the present invention will be readily appreciated as the same becomes better understood after reading the subsequent description taken in conjunction with the accompanying drawings.

BRIEF DESCRIPTION OF THE DRAWINGS

FIG. 1 is an elevational view of a vehicle seat illustrated in operational relationship with a vehicle.

FIG. 2 is a perspective view of a rotary action switch assembly, according to the present invention, illustrated in operational relationship with the vehicle seat of FIG. 1.

DESCRIPTION OF THE PREFERRED EMBODIMENT(S)

Figure 3:
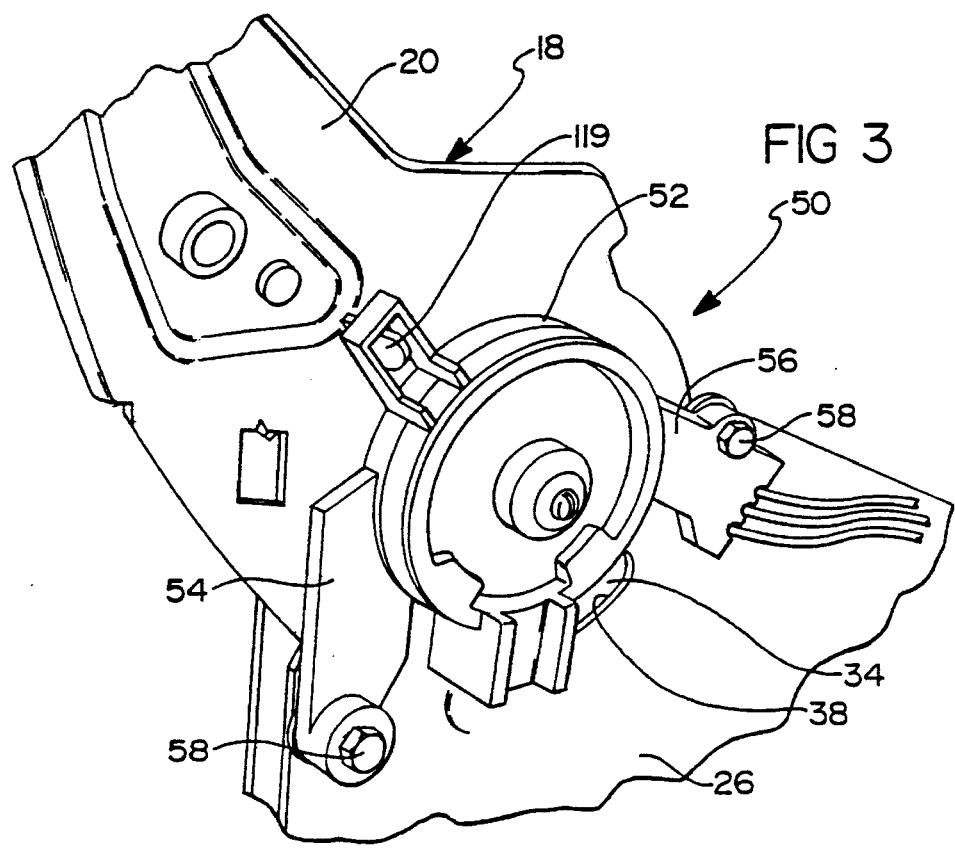
FIG. 3 is an enlarged perspective view of the rotary action switch assembly and a portion of the vehicle seat of FIG. 2.

Turning now to the drawings and in particular to FIG. 1 thereof, a vehicle seat 10 is illustrated in operational relationship with a vehicle 12 such as an automotive vehicle. The vehicle seat 10 includes a generally horizontal seat portion 14 and a generally upright back portion 16. The vehicle seat 12 may also include a head rest portion (not shown) connected to the back portion 16 in a known manner. The seat portion 14 may be mounted by a pair of laterally spaced tracks (not shown) upon vehicle structure such as a floor pan (not shown). It should be appreciated that the tracks allow the vehicle seat 10 to be moved or adjusted longitudinally both forward and backward.

Figure 5:
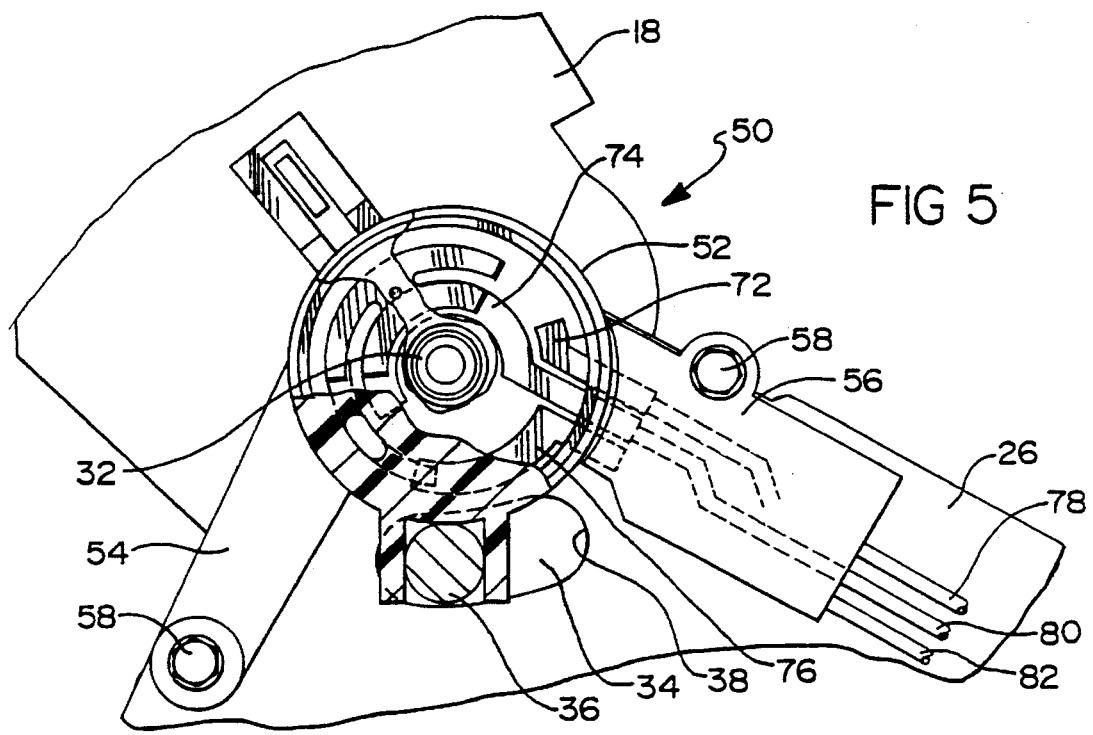
FIG. 5 is a fragmentary elevational view of the rotary action switch assembly and a portion of the vehicle seat of FIGS. 2 and 3.

Referring to FIGS. 2 and 5, the vehicle seat 10 also includes a recliner or connection mechanism, generally indicated at 18, interconnecting the seat portion 14 and back portion 16 so that the inclination of the back portion 16 relative to the seat portion 14 can be changed. The recliner mechanism 18 includes a back member 20 connected to a back frame 22 of the back portion 16 by suitable means such as fasteners 24. The recliner mechanism 18 also includes a seat member 26 connected to a seat frame 28 of the seat portion 14 by suitable means such as fasteners 30. The recliner mechanism 18 includes a pin 32 interconnecting the back member 20 and seat member 26 to allow the back member 20 to rotate relative to the seat member 26.

The recliner mechanism 18 includes a sector member 34 disposed and rotatable about the pin 32. The sector member 34 is an elongated member having a plurality of teeth (not shown) at one end for a function to be described. The sector member 34 also includes a pin member 36 extending generally perpendicular thereto and disposed between the pin 32 and the teeth. The pin member 36 extends through a slot 38 in the seat member 26. The slot 38 is generally arcuate a predetermined distance to control the amount of rotation of the sector member 34 relative to the seat member 24.

The recliner mechanism 18 also includes a recline motor 40 secured to the seat member 26 by suitable means such as fasteners (not shown). The recline motor 40 is connected to a source of power (not shown). The recliner mechanism 18 includes a Bowden cable 42 connected to the recline motor 40 and having teeth (not shown) at a free end thereof to form a worm type of gear. The recliner mechanism 18 also includes a gear train (not shown) interconnecting the teeth of the cable 42 and the sector member 34. The recliner mechanism 18 further includes a lever 44 which cooperates with the sector member 34 to allow an operator to manually lift and move the back member 20 and back portion 16 between a neutral upright position and a forward dump position. It should be appreciated that the recliner mechanism 18 is conventional and known in the art.

Figure 4:
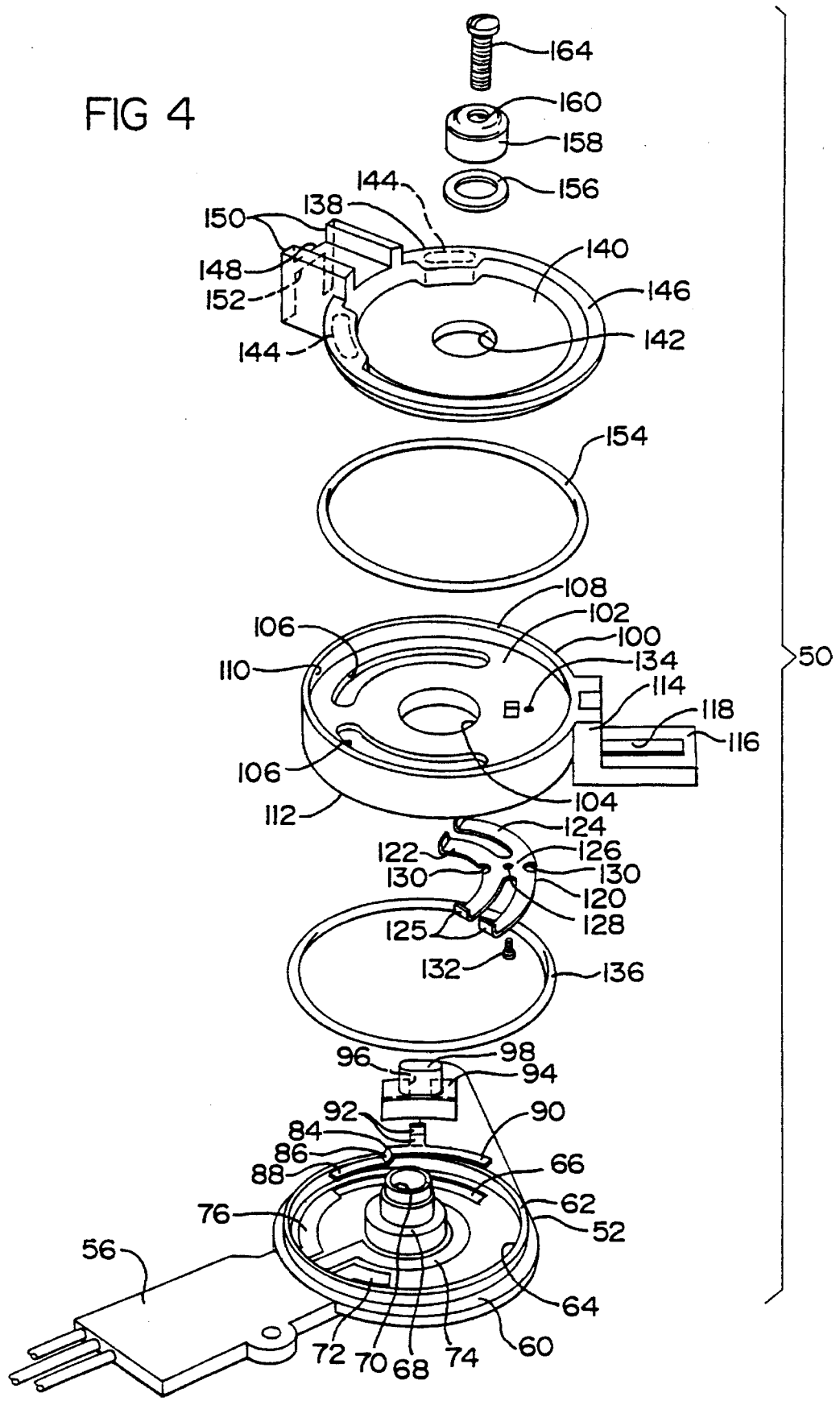
FIG. 4 is an exploded view of the rotary action switch assembly of FIGS. 2 and 3.

Referring to FIGS. 2 through 4, the rotary action switch assembly 50, according to the present invention, is illustrated in operational relationship with the vehicle seat 12. The rotary action switch assembly 50 includes a base member 52 disposed about the pin 32 and having first and second arms 54 and 56 secured to the seat member 24 by suitable means such as fasteners 58. The base member 52 has a generally planar and circular base wall 60 and an annular side wall 62 to form a cavity 64. The base wall 60 includes a recess or groove 66 within the cavity 64 having a predetermined arcuate length for a function to be described.

The base member 52 has a cylindrical stepped projection 68 centrally located within the cavity 64 and extending generally perpendicular to the base wall 60. The stepped projection 68 forms a cavity (not shown) on one side to receive the pin 32. The stepped projection 68 has an aperture 70 extending axially therethrough to the cavity. The aperture 70 has a threaded portion (not shown) for a function to be described.

The base member 52 further includes first, second and third contacts 72, 74 and 76, respectively, disposed within the cavity 64. The contacts 72,74,76 are planar strips having predetermined arcuate lengths and spaced radially such that the contacts 72,74,76 do not contact each other. The contacts 72,74,76 are made of a suitable metal material such as brass and are secured to the base wall 60 by suitable means such as insert molding. The base member 52 also includes electrical wires 78, 80 and 82 connected to and extending from the contacts 72, 74 and 76, respectively. One end of the contacts 72,74,76 and the electrical wires 78,80,82 are molded into the first arm 56. The base member 52 is made of a plastic material such as polypropolene. It should be appreciated that the other end of the electrical wires 78,80, 82 are connected to an electronic controller (not shown). It should also be appreciated the first contact 72 receives power to indicate a forward dump position, the second contact 74 is a ground and the third contact 76 receives power to indicate a rearward recline position.

The rotary action switch assembly 50 includes an adjuster shunt 84 disposed within the cavity 64 of the base member 52. The adjuster shunt 84 is a generally planar strip having a predetermined arcuate length. The adjuster shunt 84 is stepped axially by a wall 86 to form a lower portion 88 and an upper portion 90. The lower portion 88 is disposed in the groove 66 and may move along the groove 66. The movement of the lower portion 88 is limited by engagement between the wall 86 and free end of the lower portion 88 with the ends of the groove 66. The upper portion 90 may have a detent (not shown) at the free end to insure contact with the third contact 76. The adjuster shunt 84 also has a pair of radially spaced arms 92 extending axially for a function to be described. The adjuster shunt 84 is made of a suitable metal material such as brass.

The rotary action switch assembly 50 also includes an adjuster member 94 to cooperate with the adjuster shunt 84. The adjuster member 94 has a predetermined arcuate length with opposed and generally rectangular recesses 96 extending axially along each side. The recesses 96 receives the arms 94 of the adjuster shunt 84 to cooperate therewith. The adjuster member 94 also has a projection 98 of a predetermined arcuate length extending generally axially therefrom for a function to be described. Preferably, the projection 98 has a length less than the remainder of the adjuster member 94. The adjuster member 94 is made of a plastic material such as polypropolene.

The rotary action switch assembly 50 includes an actuator member 100 driven by the back member 20 of the recliner mechanism 18. The actuator member 100 has a generally planar and circular base wall 102. The base wall 102 has a central aperture 104 extending therethrough to receive the projection 68 of the base member 52. The base wall 102 also has a pair of slots or tracks 106 extending therethrough which are circumferentially spaced and have predetermined arcuate lengths. The actuator member 100 also has an annular side wall 108 extending along an outer periphery of the base wall 102 to form upper and lower cavities 110 and 112, respectively. The actuator member 100 has a flange 114 extending axially from the outer periphery of the side wall 108 and an arm 116 extending radially from a free end of the flange 114. The arm 116 is generally rectangular in shape and a generally rectangular aperture 118 extends axially through the flange 114 and arm 116. The aperture 118 receives a tab 119 extending generally perpendicularly from the back member 20 to orientate the actuator member 100 relative to the base member 52 such that the slots 106 are disposed over the contacts 72 and 76 and to allow the back member 20 to drive or rotate the actuator member 100 relative to the base member 52. The actuator member 100 is made of a plastic material such as polypropolene.

The rotary action switch assembly 50 also includes a contact member 120 disposed in the lower cavity 112 of the actuator member 100. The contact member 120 has inner and outer strips 122 and 124 spaced radially and having predetermined arcuate lengths. The strips 122,124 are inclined axially and have a flange 125 generally perpendicular thereto to form a contact point to contact the contacts 72,74,76. The strips 122,124 are interconnected by a connecting wall 126 having an aperture 128 extending therethrough. The strips 122,124 have opposed recesses 130 to receive corresponding projections (not shown) disposed within the lower cavity 112 of the actuator member 100 to orientate the contact member 120 relative to the actuator member 100. The contact member 120 is secured to the base wall 102 of the actuator member 100 by suitable means such as a fastener 132 which extends through the aperture 128 and engages an aperture 134 in the base wall 102 of the actuator member 100. The contact member 120 is made of a suitable metal material such as brass.

The rotary action switch assembly 50 includes a first seal 136 for sealing the cavities 64 and 112 of the base member 52 and actuator member 100, respectively. The first seal 136 is an O-ring made of a suitable elastomeric material and disposed about an outer periphery of the side wall 62 of the base member 52 and an inner periphery of the side wall 108 of the actuator member 100. It should be appreciated that the first seal 136 prevents foreign contaminants from entering the cavities 64 and 112.

The rotary action switch assembly 50 also includes a top actuator 138 driven by the pin 36 of the sector member 34 of the recliner mechanism 18 to drive or rotate the adjuster member 94. The top actuator 138 has a generally planar and circular top wall 140. The top wall 140 has a central aperture 142 extending axially therethrough to receive the projection 68 of the base member 52. The top wall 140 also has at least one, preferably a pair of recesses 144 which are circumferentially spaced and have predetermined arcuate lengths to receive the projection 98 of the adjuster member 94. The top actuator 138 also has an annular flange 146 extending radially and along an outer and upper periphery of the top wall 140. The top actuator 138 has a side flange portion 148 extending radially from the flange 146 and end flanges 150 extending axially from sides of the side flange 148. The side and end flanges 148 and 150 are generally rectangular in shape to form a generally rectangular pocket 152. The pocket 152 receives the pin 36 of the sector member 34 to orientate the top actuator 138 relative to the actuator member 100 and base member 52 such that one of the recesses 144 receives the projection 98 of the adjuster member 94 and to allow the pin 36 to drive or rotate the top actuator 138 relative to the base member 52. The top actuator 138 is made of a plastic material such as polypropylene. It should be appreciated that the top actuator 138 drives or rotates the adjuster member 94 and shunt member 84. It should also be appreciated that the top actuator 138 has a pair of recesses 144 to allow for right hand and left hand versatility for the rotary action switch assembly 50.

The rotary action switch assembly 50 includes a second seal 154 for sealing the upper cavity 110 of the actuator member 100. The second seal 154 is an O-ring made of a suitable elastomeric material and disposed about an outer periphery of the top wall 140 of the top actuator 138 and an inner periphery of the side wall 108 of the actuator member 100. It should be appreciated that the second seal 154 prevents foreign contaminants from entering the upper cavity 110.

The rotary action switch assembly 50 also includes a washer 156 disposed over the projection 68 of the base member 52 and contacting the top wall 140 of the top actuator 138. The rotary action switch assembly 50 includes a cap 156 disposed over the projection 68 and contacting the washer 156. The cap 158 has a central aperture 160 extending axially therethrough. The rotary action switch assembly 50 further includes a fastener 162 which extends through the aperture 160 and threadably engages the threaded portion of the aperture 70 of the projection 68 to secure the cap 160, washer 156, top actuator 138, and actuator member 100 to the base member 52. It should be appreciated that heat staking could be used in place of the fastener 162.

Figure 6:
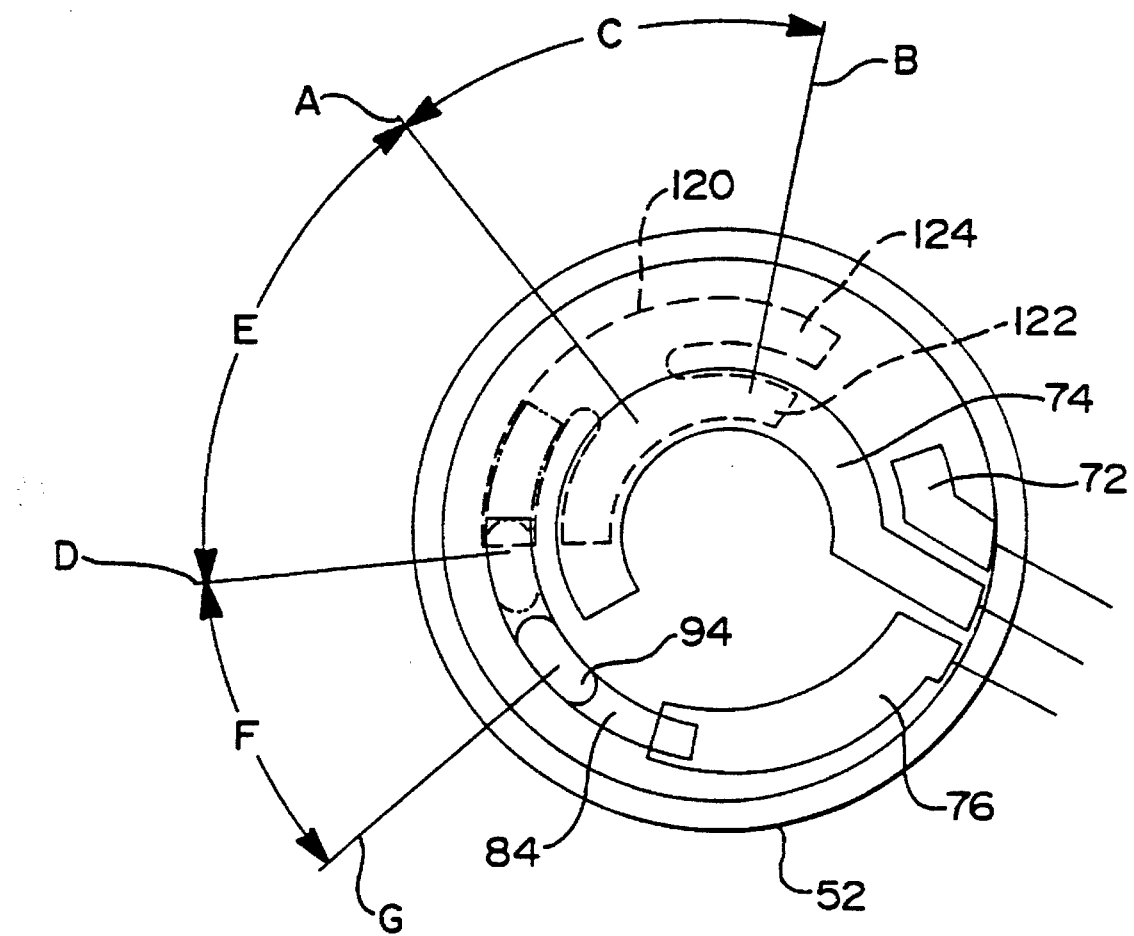
FIG. 6 is a schematic elevational view of the rotary action switch assembly of FIGS. 2 and 3 illustrating operative positions of the vehicle seat.

Referring to FIG. 6, in operation, when the rotary action switch assembly 50 is assembled and secured to the recliner mechanism 18. Typically, the back portion 16 is in a neutral upright position relative to the seat portion 14. In this position, the contact member 120, having a central axis A, is disposed in a neutral position such that the contact member 120 contacts the contacts 74, adjuster shunt 84 and contact 76 and does not contact the contact 72. As a result, current flows through contact 76, adjustor shunt 84, contact member 120 and contact 74 to send a signal to the electronic controller that the back portion 16 is in a neutral upright position.

When an operator actuates the lever 44 of the recliner mechanism 18 and moves or rotates the back portion 16 forward to the dump position defined by axis B, the tab 119 moves or drives the actuator member 100 to rotate the contact member 120 such that the strips 122 and 124 make contact with the contacts 74 and 72, respectively, and breaks contact with the adjuster shunt 84. When this occurs, the central axis A of the contact member 120 rotates through an angle C such as 37.1° to align the axis A with axis B. A circuit is closed to allow power from the power source to flow through the contacts 72,74 and contact member 120 to send a signal to the electronic controller to signal that the recliner mechanism 18 is in the forward dump position. It should be appreciated that the top actuator 138, adjuster member 94 and adjuster shunt 84 remain stationary relative to the actuator member 100 and base member 52 when the back portion 14 is moved to the dump position. It should also be appreciated that the operation is reversed for moving the back portion 14 from the forward dump position to the neutral upright position.

When the recline motor 40 is activated, the recline motor 40 rotates the gear train and sector member 34. The sector member 34 moves or rotates the back portion 14 rearward to the recline position defined by axis D. The tab 119 moves or drives the actuator member 100 to rotate the contact member 120. The central axis A of the contact member 120 rotates through an angle E such as 30° to align the axis A with axis D. Simultaneously, the sector member 34 rotates the pin 36 and drives or moves the top actuator 138, in turn, driving or moving the adjuster member 94 and adjuster shunt 84. The central axis of the adjuster member 94 rotates through an angle F such as 30° to a recline position defined by axis G. As a result, the adjuster shunt 84 remains in contact with the strip 124 of the contact member 120 and the contact 76, and the strip 122 of the contact member 120 remains in contact with the contact 74. As this occurs, the circuit remains closed to allow power from the power source to flow through the contacts 74,76 and contact member 120 and adjuster shunt 84 to send a signal to the electronic controller to signal that the recliner mechanism 18 is in the neutral upright position.

Accordingly, the rotary action switch assembly 50 provides multiple switched/unswitched zones and accommodates overtravel and tolerances in the final assembly. The rotary action switch assembly 50 is self-contained and insensitive to assembly variations. The adjuster shunt 84 acts as a bridge to give consistent switch and variable operating range over the full recline movement. The adjuster shunt 84 may be optional, but shortens or lengthens rear switch contact as the back portion 16 is reclined.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A rotary action switch assembly mounted on a vehicle seat comprising:

a base member operatively connected to a seat portion of the vehicle seat;

an actuator member cooperating with said base member and operatively connected to a back portion of the vehicle seat; and contact means disposed between said base member and said actuator member for opening and closing circuits indicative of positions of inclination of the back portion relative to the seat portion as said actuator member is rotated relative to said base member when the back portion is inclined relative to the seat portion.

2. A rotary action switch assembly as set forth in claim 1 wherein said base member includes means forming a cavity to receive a portion of said contact means.

3. A rotary action switch assembly as set forth in claim 2 wherein said contact means comprises a first contact disposed in said cavity indicative of a forward dump position of the back portion, a second contact connected to an electrical ground, and a third contact indicative of a rearward recline position of the back portion.

4. A rotary action switch assembly as set forth in claim 3 wherein said contact means further comprises a contact member connected to said actuator member and disposed in said cavity for providing contact between said first and second contacts when said back portion is in a forward dump position and between said second and third contacts when said back portion is in a rearward recline position.

5. A rotary action switch assembly as set forth in claim 1 including means for securing said base member to a stationary portion of a recliner mechanism interconnecting the back portion and seat portion.

6. A rotary action switch assembly as set forth in claim 5 including connecting means for connecting said actuator member to a moveable portion of the recliner mechanism.

7. A rotary action switch assembly as set forth in claim 6 wherein said connecting means comprises a flange extending from said actuator member and having an aperture extending therethrough to receive a tab extending from the moveable portion of the recliner mechanism.

8. A rotary action switch assembly as set forth in claim 6 including rotational means for pivotally connecting said base member and said actuator member together to allow rotation therebetween.

9. A rotary action switch assembly as set forth in claim 8 wherein said rotational means comprises a projection extending axially from said base member, said actuator member having a central aperture for receiving said projection.

10. A rotary action switch assembly as set forth in claim 1 including retaining means for retaining said actuator member to said base member.

11. A rotary action switch assembly as set forth in claim 1 including sealing means for sealing between said actuator member and said base member.

12. A rotary action switch assembly mounted on a vehicle seat, said vehicle seat having a seat portion mounted to vehicle structure, an upright back portion and a recliner mechanism interconnecting the seat portion and back portion to change inclination of the back portion relative to the seat portion, comprising:

a base member operatively connected to the seat portion of the vehicle seat;

an actuator member cooperating with said base member and operatively connected to a back portion of the vehicle seat;

securing means for securing said base member to a stationary portion of the recliner mechanism;

connecting means for connecting said actuator member to a moveable portion of the recliner mechanism;

rotational means for pivotally connecting said base member and said actuator member together to allow rotation therebetween; and contact means disposed between said base member and said actuator member for opening and closing circuits indicative of positions of inclination of the back portion relative to the seat portion as said actuator member is rotated relative to said base member when the base portion is inclined relative to the seat portion.

13. A rotary action switch assembly as set forth in claim 12 wherein said base member includes means forming a cavity to receive a portion of said contact means.

14. A rotary action switch assembly as set forth in claim 13 wherein said contact means comprises a first contact disposed in said cavity indicative of a forward dump position of the back portion, a second contact connected to an electrical ground, and a third contact indicative of a rearward recline position of the back portion.

15. A rotary action switch assembly as set forth in claim 14 wherein said contact means further comprises a contact member connected to said actuator member and disposed in said cavity for providing contact between said first and second contacts when said back portion is in a forward dump position and between said second and third contacts when said back portion is in a rearward recline position.

16. A rotary action switch assembly as set forth in claim 12 wherein said rotational means comprises a projection extending axially from said base member, said actuator member having a central aperture for receiving said projection.

17. A rotary action switch assembly as set forth in claim 12 wherein said connecting means comprises a flange extending from said actuator member and having an aperture extending therethrough to receive a tab extending from the moveable portion of the recliner mechanism.

18. A rotary action switch assembly as set forth in claim 12 including retaining means for retaining said actuator member to said base member.

19. A rotary action switch assembly as set forth in claim 12 including sealing means for sealing between said actuator member and said base member.

20. A vehicle seat comprising:

a seat portion mounted to vehicle structure;

an upright back portion;

a recliner mechanism interconnecting said seat portion and back portion so that inclination of said back portion relative to said seat portion can be changed; and a rotary action switch assembly operatively connected to said recliner mechanism for rotationally opening and closing circuits indicative of positions of inclination of said back portion relative to said seat portion as said back portion is inclined relative to said seat portion.

* * * * *